(12) United States Patent
Vulkan et al.

(10) Patent No.: US 10,300,787 B2
(45) Date of Patent: May 28, 2019

(54) FUEL-VAPOR VALVE SYSTEM AND COMPONENTS THEREFOR

(71) Applicant: RAVAL A.C.S. LTD., Beer-Sheva (IL)

(72) Inventors: Omer Vulkan, D.N. Hanegev (IL); Alon Rahamim, Beer-Sheva (IL); Vladimir Olshanetsky, Beer Sheva (IL); Denis Kleyman, Beer Sheva (IL)

(73) Assignee: RAVAL A.C.S. LTD., Beer-Sheva (IL)

( * ) Notice: Subject to any disclaimer, the term of this patent is extended or adjusted under 35 U.S.C. 154(b) by 709 days.

(21) Appl. No.: 14/388,093

(22) PCT Filed: Mar. 21, 2013

(86) PCT No.: PCT/IL2013/050284
§ 371 (c)(1),
(2) Date: Sep. 25, 2014

(87) PCT Pub. No.: WO2013/144960
PCT Pub. Date: Oct. 3, 2013

(65) Prior Publication Data
US 2015/0151631 A1 Jun. 4, 2015

Related U.S. Application Data

(60) Provisional application No. 61/615,387, filed on Mar. 26, 2012.

(51) Int. Cl.
*B60K 15/035* (2006.01)
*B60K 15/03* (2006.01)

(52) U.S. Cl.
CPC ............ *B60K 15/03519* (2013.01); *B60K 2015/0358* (2013.01); *B60K 2015/03289* (2013.01);

(Continued)

(58) Field of Classification Search
CPC ........ Y10T 137/0874; Y10T 137/3099; B60K 15/035; B60K 15/03504; B60K 15/03519;
(Continued)

(56) References Cited

U.S. PATENT DOCUMENTS 3,699,942 A * 10/1972 Moray ............... F01L 3/08
123/188.6
5,071,018 A * 12/1991 Moore ............... B60K 15/04
220/86.2

(Continued)

FOREIGN PATENT DOCUMENTS

CN 102109054 A 6/2011
DE 195 47 070 A1 6/1997
(Continued)

OTHER PUBLICATIONS

International Search Report for International Application No. PCT/IL2013/050284, four pages, dated Oct. 2, 2013.
Examination Report from India, dated Nov. 30, 2018, 5 pages.

*Primary Examiner* — Craig J Price
(74) *Attorney, Agent, or Firm* — Vorys, Sater, Seymour and Pease LLP

(57) ABSTRACT

Provided is a roll over fuel-vapor valve is provided including a housing defining a valve having a valve inlet port extending through a wall of the housing and a valve outlet port and a float member disposed between the inlet port and the outlet port and being displaceable between an open position and a closed position the hosing further comprising a fluid flow channel extending along a top portion thereof and having a first end and a second end, wherein the outlet port extending into the channel such that in the open position fluid flow is facilitated between the valve inlet port and the channel.

18 Claims, 12 Drawing Sheets

(52) U.S. Cl.
CPC ............ *B60K 2015/03388* (2013.01); *B60K 2015/03523* (2013.01); *B60K 2015/03528* (2013.01); *B60K 2015/03542* (2013.01); *Y10T 137/3099* (2015.04); *Y10T 137/7837* (2015.04)

(58) Field of Classification Search
CPC .... B60K 15/03289; F16L 47/02; F16L 47/14; F02M 37/017; F02M 37/0076; F16K 24/04; F16K 24/06; F16K 27/07
USPC ......... 138/119, 120; 220/4.14, 746; 137/202
See application file for complete search history.

(56) References Cited

U.S. PATENT DOCUMENTS

| | | | |
|---|---|---|---|
| 5,782,258 A | 7/1998 | Herbon et al. | |
| 6,062,250 A | 5/2000 | Takahashi | |
| 6,508,275 B1 * | 1/2003 | Sadr | B60K 15/04 138/109 |
| 7,318,445 B2 * | 1/2008 | Ohshiro | B60K 15/035 137/202 |
| 7,520,293 B2 * | 4/2009 | Hilderley | B60K 15/035 137/202 |
| 8,376,180 B2 * | 2/2013 | Vulkan | B60K 15/035 220/562 |
| 8,622,074 B2 * | 1/2014 | Hochstein | B60K 15/03519 137/202 |
| 8,763,626 B2 | 7/2014 | Cuvelier et al. | |
| 2001/0011538 A1 * | 8/2001 | Crary | B60K 15/035 123/509 |
| 2001/0054452 A1 | 12/2001 | Ozaki | |
| 2004/0086331 A1 | 5/2004 | Iwamoto | |
| 2005/0016601 A1 | 1/2005 | Reiter et al. | |
| 2005/0172999 A1 | 8/2005 | Ohshiro et al. | |
| 2009/0014090 A1 | 1/2009 | Roscher et al. | |
| 2009/0321461 A1 | 12/2009 | Vulkan et al. | |
| 2010/0155503 A1 | 6/2010 | Dermitzakis et al. | |

FOREIGN PATENT DOCUMENTS

| | | | |
|---|---|---|---|
| EP | 0 724 098 A1 | 7/1996 | |
| JP | 8-128371 A | 5/1996 | |
| JP | 8-254278 A | 10/1996 | |
| JP | 11-210584 A | 8/1999 | |
| JP | 2006-118412 A | 5/2006 | |
| JP | 2009-542527 A | 12/2009 | |
| JP | 2011-927 A | 1/2011 | |
| JP | 2013177118 A * | 9/2013 | ....... B60K 15/03519 |
| SU | 1754496 A1 | 8/1992 | |
| WO | 01/07806 A1 | 2/2001 | |
| WO | 2008/007352 A2 | 1/2008 | |

* cited by examiner

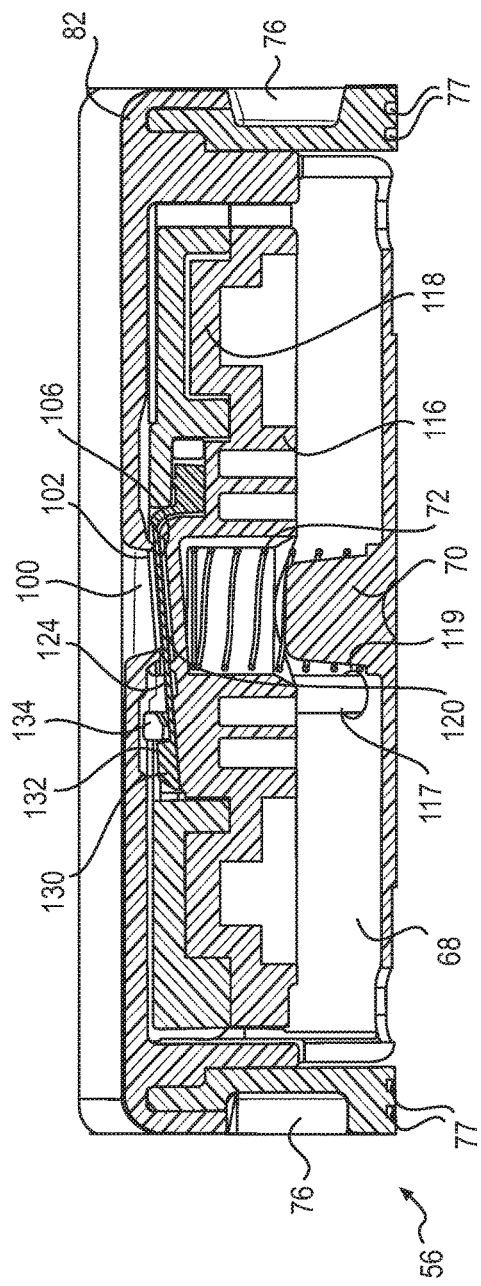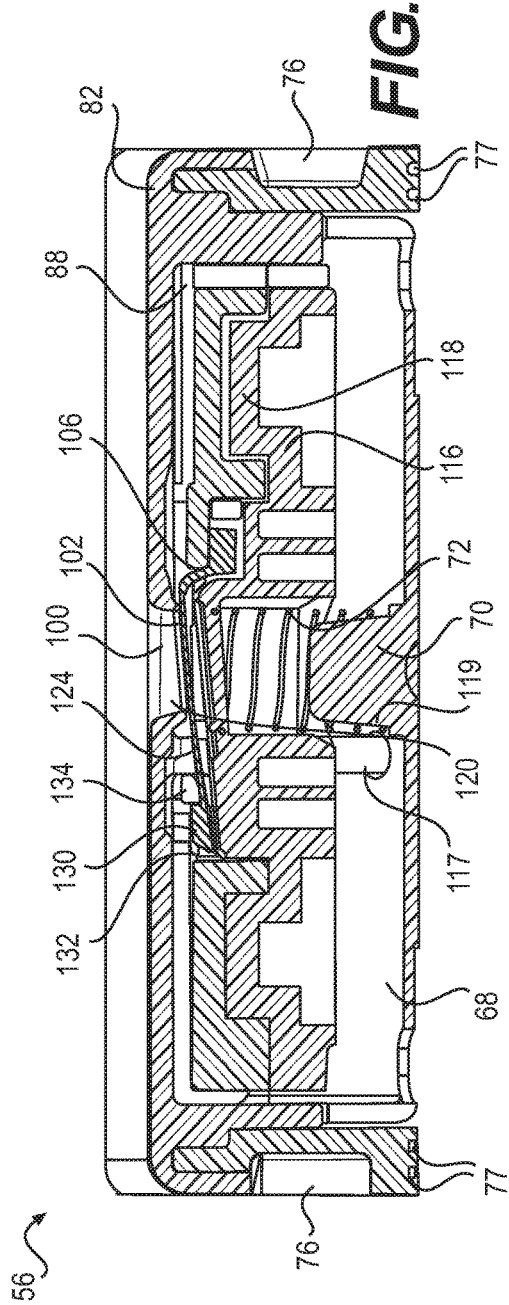

FUEL-VAPOR VALVE SYSTEM AND COMPONENTS THEREFOR

FIELD OF THE DISCLOSED SUBJECT MATTER

The present disclosed subject matter relates to fuel-vapor valve systems and to components therefore. More particularly the disclosure is concerned with a fuel-vapor system and components therefore configured as a low-profile fuel-vapor system.

The term low profile fuel-vapor system as used herein the specification and claims denotes a vehicle fuel-vapor system of considerable small dimensions, rendering it suitable for applying in so-called flat fuel tanks and fuel tanks having special geometric architecture.

GENERAL DESCRIPTION OF THE DISCLOSED SUBJECT MATTER

The present disclosed subject matter offers, according to a first of its aspects, a vehicle fuel-vapor system configured with one or more fuel-vapor tube segments and at least one fuel-vapor system component disposed in continuation with said one or more fuel-vapor tube segments and wherein the fuel-vapor system has a substantially low profile, i.e. a low (short) footprint, namely the height of valve components is substantially equal to the diameter of the fuel-vapor tube segments.

According to some particular configurations, the maximum height of valve components is less than twice the diameter of the fuel-vapor tube segments, and typically does not exceed the diameter of the fuel-vapor tube segments. Namely, a vehicle fuel-vapor system configured with one or more fuel-vapor tube segments and at least one fuel-vapor system component disposed in continuation with said one or more fuel-vapor tube segments and wherein the overall height of components disposed along the one or more fuel-vapor tube segments is substantially equal to the diameter of the fuel-vapor tube segments. However it is appreciated that according to some configuration a snap-in venting valve may be snappingly attached to a location of the fuel-vapor tube segments.

At least a portion of the one or more fuel-vapor tube segments is a flexible tube. According to a particular example flexible portions are a corrugated tube.

According to another aspect of the presently disclosed subject matter there is provided a roll over fuel-vapor valve comprising a housing defining a valve having a valve inlet port extending through a wall of the housing and a valve outlet port and a float member disposed between said inlet port and said outlet port and being displaceable between an open position and a closed position said hosing further comprising a fluid flow channel extending along a top portion thereof and having a first end and a second end, wherein said outlet port extending into said channel such that in said open position fluid flow is facilitated between said valve inlet port and said channel.

According to another aspect of the present disclosed subject matter there is provided a roll over fuel-vapor valve (ROV) comprising a substantially tubular housing accommodating a cage assembly fixedly disposed within the housing and configured with at least one inlet port extending through a wall of the housing and being in fluid flow communication with a valve outlet port which is in fluid flow communication with a fluid flow channel of the housing, said cage assembly accommodating a float member axially displaceable within the cage assembly between an open position, and a closed position.

At the open position the float member is at a bottom position thereof and the outlet port is open, thus facilitating fluid flow from the inlet port, through the outlet port and out to the fluid flow channel. At the closed position the float member is biased upwards into sealing engagement of the outlet port.

Any one or more of the following features and designs can be configured in a fuel-vapor system and a valve, according to the presently disclosed subject matter, individually or in combinations thereof:

- the housing inlet and the channel outlet are sealed form an inside space of the valve unit (but through the valve outlet port, however only when the latter is opened to facilitate fluid flow to the fluid flow channel);
- the inside space of the valve is vented by one or more venting openings configured in the housing at an upper portion thereof;
- an elongated flexible closure membrane strip is secured over a top surface of the float member, however with axial freedom imparted thereto such that the strip is slidingly retained over the float member and deformable;
- the float member is spring biased into its upper, closed position. The arrangement is such that the spring biasing together with buoyancy forces acting on the float member tend to press the membrane strip into sealing engagement with an opening of the outlet port, whilst gravity forces acting on the float member tend to displace it away from the opening of the outlet port so as to progressively detach the membrane strip from sealing engagement with the outlet port;
- according to one example, the elongated flexible closure membrane strip is fixedly anchored at one end thereof at a face of the float member and adjacent the outlet port, whereby at the closed position the membrane strip is sealingly biased against the outlet port, and displacement of the float member into the open position entails progressive detachment of the membrane strip from sealing engagement with the outlet;
- a first end of the elongated flexible closure membrane strip is fixedly anchored at one end thereof to the float member, and a second end thereof is slidingly secured to the float member, such that the membrane strip is deformable by sliding displacement of the second end over the float member;
- according to another example the elongated flexible closure membrane strip is slidingly secured at both ends thereof at a face of the float member and adjacent the outlet port;
- the flexible elongated membrane strip is disposed with a longitudinal axis thereof extending substantially parallel to a longitudinal axis of the tubular housing;
- the flexible elongated membrane strip is disposed with a longitudinal axis thereof extending substantially transverse a longitudinal axis of the tubular housing;
- the flexible elongated membrane strip is deformable in a vertical sense at an extent less than the vertical displacement of the float member within the housing, to thereby ensure that at a downwards displaced position of the float member the membrane strip fully detaches from the valve seating of the outlet port;
- the outlet port is configured as an elongate opening, i.e. having a longitudinal axis extending substantially parallel to a longitudinal axis of the housing. According to a particular example, the elongate opening narrows towards a first end, said first end being first to open upon detaching of the membrane strip therefrom;

the flexible elongated membrane strip is articulated over the float member in a fashion to commence its peeling from the a narrow-most end of the elongate opening;

the float member is configured at a bottom side thereof with one or more voids, with an opening facing the one or more inlet ports and however sealed at an upper side thereof;

a valve seating of the outlet port is inclined with respect to a longitudinal axis of the housing, i.e. inclined with respect to an axis of displacement of the float member;

a surface of the float member adjacent the valve seating of the outlet port is substantially equally inclined with respect to an axis of displacement of the float member, whereby the membrane strip, when in sealing engagement with the valve seating, is pressed along its length against said valve seating by said inclined surface of said float member;

at an upright position the float member is displaceable about a substantially vertical axis and the fluid flow channel of the housing extends substantially horizontally;

the at least one inlet port coextends through a wall of the housing, at a bottom face thereof;

according to one configuration the fluid flow channel extends from the outlet port of the valve to an channel outlet; according to a modification the housing is further configured with a housing inlet being in flow communication with the fluid flow channel. When inactive, the channel outlet can be sealed by a sealing plug;

the housing inlet is configured for coupling to a neighboring fuel-vapor component;

the housing is an integral portion of a fuel-vapor tube segment, or attached to a fuel-vapor tube segment at least at a channel outlet of the fuel-vapor valve. The valve unit can be placed within the fuel-vapor tube segment during an extrusion process;

the float member is displaceable about less than the radii of the housing diameter;

the float member having a first dimension in the direction of the displacement thereof and a second dimension in a direction perpendicular to the first dimension wherein said second dimension is at least twice the first dimension the housing Inlet and the channel outlet extend substantially coaxial and at an assembled position about a substantially horizontal axis;

the housing inlet and the channel outlet extend substantially coaxially with the pipe of a fuel-vapor valve system;

the length of the housing is at least three times its diameter;

the float member is configured for smooth axial displacement over at least a pair of guides projecting from one or both of the cage assembly and the housing, so as to prevent clamping thereof during upwards or downwards displacement thereof. The guides can be projecting posts and/or ribs. The guides likely extend proximate to a center axis of the float member;

fluid flow between the housing inlet and the channel outlet, through the fluid flow channel, takes place regardless of the position of the valve unit;

according to a particular configuration, the cage assembly comprises a pair of side plates sealingly disposed within the housing at respective sides of the at least one inlet port, a bridging member extending between the side plates and spaced from an inside surface of the housing, said bridging member constituting the fluid flow channel which is sealed from an inside space of the valve unit defined between said side plates and said bridging member, but via outlet opening formed therein, and a base member disposed between the side plates and configured with a boss supporting a float member biasing spring;

fluid flow between the at least one inlet port and the valve outlet port occurs about longitudinal side edges of the float member between the float member and the base member;

the cage assembly is composed of one or more integrated components;

at least a location of the fuel-vapor tube segment, and/or the housing of the valve unit, is configured with a mounting location for imparting the housing associated therewith with an upright orientation, such that the float member is displaceable about a substantially vertical axis. Such a mounting location can be for example a flattened tubular portion configured for cooperation with a corresponding fastener element for securing the fuel-vapor system within a fuel tank;

end portions of a fuel-vapor tube segment, either configured for coextensive coupling to a neighboring fuel-vapor tube segment or for fitting with an end piece or coupling to a fuel-vapor element, such as a valve and the like, are fitted with an internal tubular coupler, configured for reinforcing the respective end of the fuel-vapor tube segment.

According to a further aspect of the presently disclosed subject matter there is provided a vehicle fuel-vapor system comprising; at least one pliable segment configured to retain the shape thereof; at least one flattened segment for applying an attachment and orientation member thereto; at least one first segment configured for receiving therein a fuel vapor accessory; and an outlet opening for coupling to an outlet aperture of a fuel tank. The pliable segment can be a convoluted flexible portion.

The flattened segment can be configured for orientation of the vehicle fuel-vapor system such that said fuel-vapor accessory is positioned in appropriate position required for proper operation thereof. The flattened segment can be configured to be snugly and securely accommodated by an attachment member. The flattened portion can be configured to be inserted in a frame portion of said attachment member.

The flattened portion can include a rectangular shape configured to be securely seated in said frame portion.

The first segment can be provided with at least one venting opening and inlet apertures for the operation of said fuel vapor accessory.

The vehicle fuel-vapor system can further include at least one second segment configured for holding a pressure holding valve. The vehicle fuel-vapor system can further comprise a pressure holding valve integrally formed within said at least one second segment. The vehicle fuel-vapor system can further comprise a pressure holding valve coupled to one end of said at least one second segment.

The vehicle fuel-vapor system can further includes at least one third segment configured for holding a drain valve. The third segment can include a drainage aperture coupling therein a drain valve.

BRIEF DESCRIPTION OF THE DRAWINGS

In order to understand the disclosure and to see how it may be carried out in practice, embodiments will now be described, by way of non-limiting examples only, with reference to the accompanying drawings, in which:

FIG. 5A illustrates a side sectional view of the valve unit at a fully closed/sealed position;

FIG. 5B illustrates the valve unit at of FIG. 5A in a consecutive opening position;

DETAILED DESCRIPTION OF EMBODIMENTS

Figure 1:
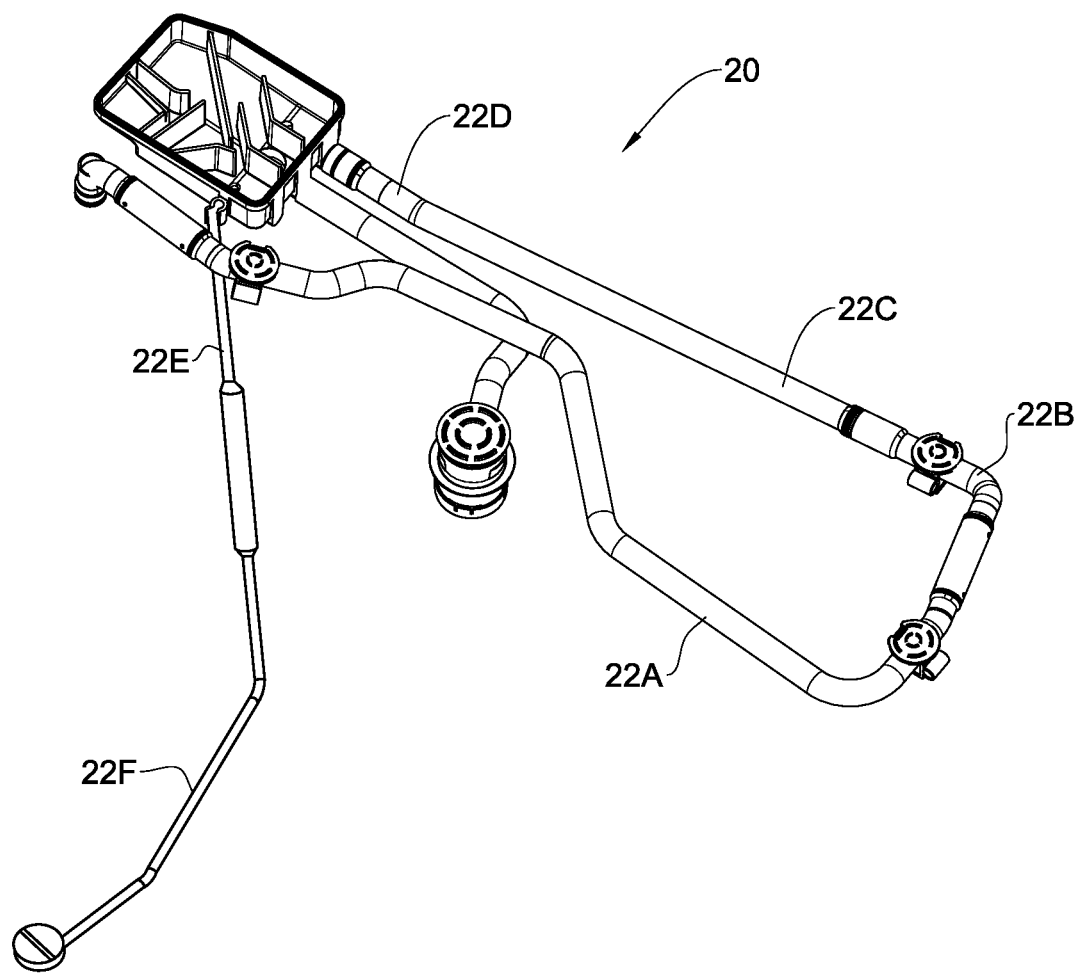
FIG. 1 illustrates the fuel-vapor system according to an example of the presently disclosed subject matter.

Attention is first directed to FIG. 1 of the drawings illustrating a fuel-vapor system generally designated 20 for mounting in a so-called flat fuel tank having a special geometric architecture designed to fit within restricted space at a vehicle's floor as done nowadays.

As can be seen, the fuel-vapor system 20 is a so-called low-profile fuel-vapor system, specially designed to fit within flat fuel tanks, though not restricted thereto and comprising a plurality of fuel-vapor tube segments 22A to 22F with a plurality of fuel-vapor control components extending between, inside or at the end of each such fuel-vapor tube segment, wherein at least some of the fuel-vapor components are in-line with the fuel-vapor tube segments as will be discussed hereinafter in further detail and which have together a substantially low profile, i.e. a short footprint.

Figure 2A:
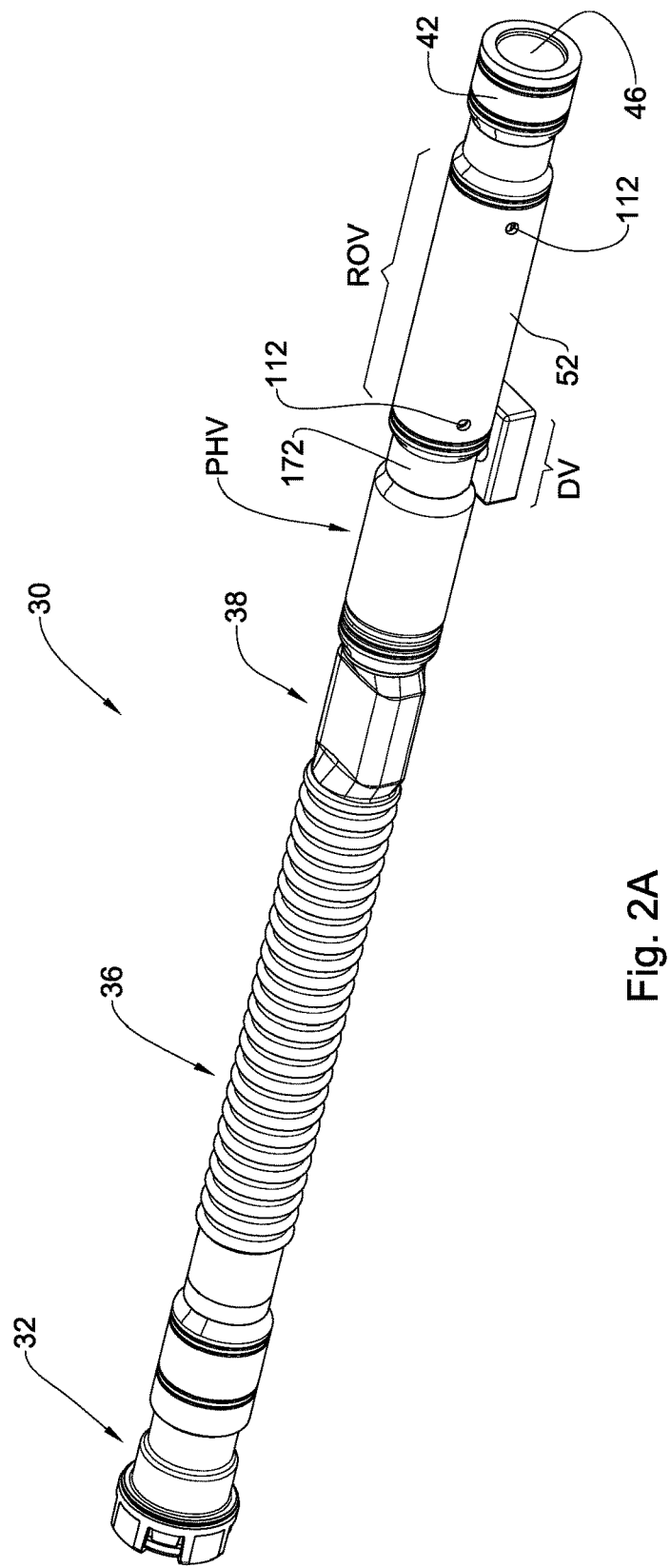
FIG. 2A is an isometric view of a fuel-vapor system having a plurality of segments configured with various fuel-vapor components according to the present disclosure.
Figure 2B:
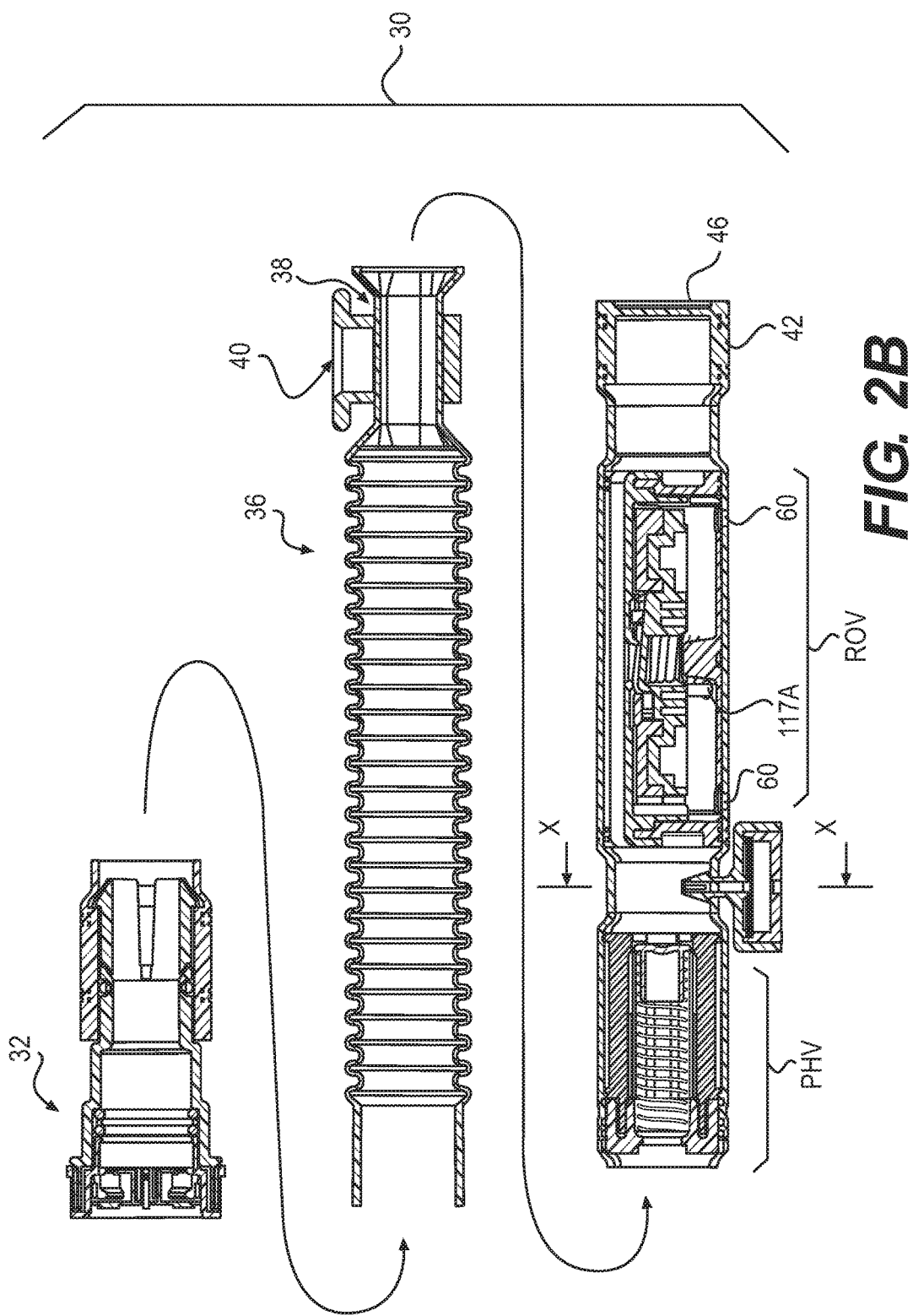
FIG. 2B is a sectioned successive view of FIG. 2A.

Further attention is now directed to FIGS. 2A and 2B illustrating a fuel-vapor tubing system, in greater detail, generally designated 30. The fuel-vapor tube system 30 comprising an end coupler generally designated 32 fitted at an end segment of the fuel-vapor tubing system 30 and configured for coupling to either a neighboring fuel-vapor tubing system (not shown) or extending out of a fuel tank and configured for coupling to a fuel-vapor vapor treating device (canister) etc. in addition, the end coupler can be fitted a closure member. Further detail of the end coupler 32 and its attachment to the respective tubular segment is discussed hereinafter with further reference to FIGS. 7A-7D.

A flexible tube segment generally designated 36 extends from the coupler 32, said flexible portion 36 is pliable however is configured to retain its shape such that when the fuel-vapor system 20 is mounted inside the tank, the flexible portion can be bent, for example to follow a inner counter of the fuel tank, while maintaining the curvature when mounted inside the tank. According to one example, the flexible portion can be a corrugated tube portion which renders the fuel-vapor tube segment flexible so as to be capable of following an internal pattern of the fuel tank by bending of the tube segment in accordance with the pattern. The corrugated portion can be configured to provide the flexible tube segment with mechanical strength such that when the flexible portion is bent for example along the inner counter of the fuel tank, the corrugated portion holds the shape thereof.

A flattened segment of the tube, designated at 38 serves for applying an attachment member 40 as will be discussed hereinafter in further detail with reference to FIGS. 11A-11C. However, it is appreciated that the flattened segment 38 serves also for orientation of the fuel-vapor tube segment and in particular the fuel-vapor elements articulated thereto, (drain valve, roll-over valve, etc.) so as to ensure that such valve units, which are gravitationally dependent, are positioned in appropriate upright position (typically so as to ensure that their respective float members are displaceable upon a substantially vertical position when installed within the vehicle's fuel tank).

Extending right side of the flattened portion 38 there is provided a tube segment having a pressure holding valve (PHV) integrated therein. PHV can be introduced into the respective tube segment during the continuous extrusion manufacturing process. The PHV is discussed hereinafter with further detail with reference to FIGS. 9A-9C.

Extending downstream with respect to said pressure holding valve PHV there is a drain valve DV which as an exception to other components of the fuel-vapor system illustrated in FIGS. 2A and 2B extends non collinear with the tube segments but rather is a snap-in type of valving unit, discussed hereinafter with further detail in FIGS. 10A to 10C.

A tubing segment having a roll-over valve (ROV) extends after said drain valve wherein the ROV can be manufactured during a continuous extrusion process. The tube segment includes apertures 60 (shown in FIG. 2B) and venting openings 112 for the operation of the ROV. Particular details of the ROV are discussed hereinafter in greater detail with respect to FIGS. 3A to 5C.

Figure 8:
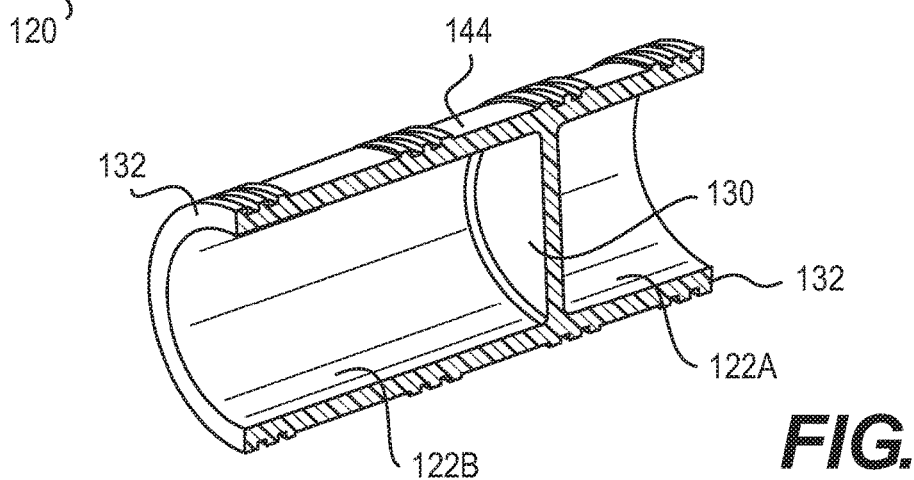
FIG. 8 is an isometric view, longitudinally sectioned, of an annular insert for use with a fuel-vapor tube segment according to the present disclosure.

As can further be seen in FIGS. 2A and 2B the right hand end 42 of the tubular fuel-vapor system 30 is configured with a reinforcing member 46 provided for securely coupling one tubular segment to another tubular segment, or a fuel-vapor accessory to the fuel-vapor segment, provision of which is discussed hereinafter with reference to FIGS. 6A and 6B. For example, if desired, the fuel-vapor tubing system 30 can be ended with a sealed end piece e.g. stopper member 130 illustrated in FIG. 8 configured for sealing arrestment within the reinforcing member 46.

Further reference is now made to FIGS. 3A to 5C there is illustrated a tubing segment having a roll-over fuel-vapor valve (ROV) generally designated 50 comprising a substantially tubular housing (coextensive with tubular segments of the fuel-vapor tube system 30 illustrated in FIGS. 2A and 2B). The tubular housing is integrated within the tube segment 52 and includes a fluid channel extending between an inlet and an outlet of the housing, and further includes a valve unit having a valve inlet and a valve outlet. The valve outlet extends into the channel.

According to an example, the tubular housing includes a cage assembly generally designated 56 fixedly disposed within the tube segment 52 and configured with a bottom portion having one or more inlet port 53 disposed in corresponding location to apertures 60 formed at a lowermost portion of the tube segment 52 (the term lowermost portion takes effect upon positioning of the system within a fuel tank by appropriate positioning arrangement namely appropriate positioning of the flattened surface 38 and attachment member used in conjunction therewith, to ensure that the ROV 50 operates appropriately).

Figure 3A:
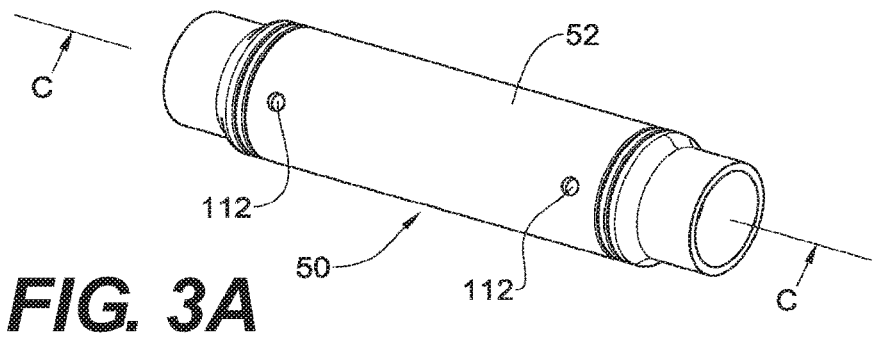
FIG. 3A is an isolation of tube segment having a ROV valve integrated therein.
Figure 3B:
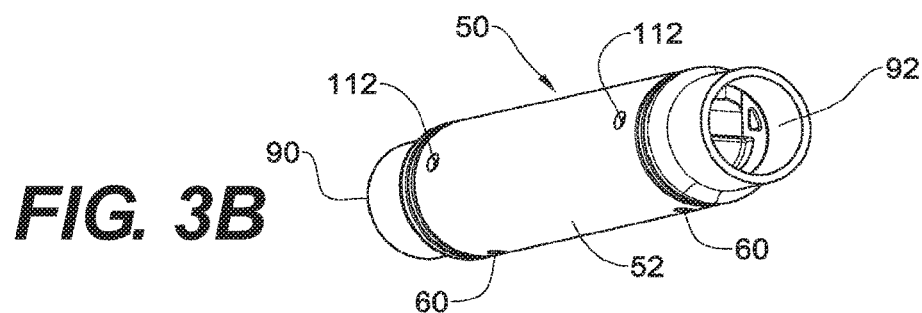
FIG. 3B is a bottom isometric view of the ROV valve of FIG. 3A.
Figure 3C:
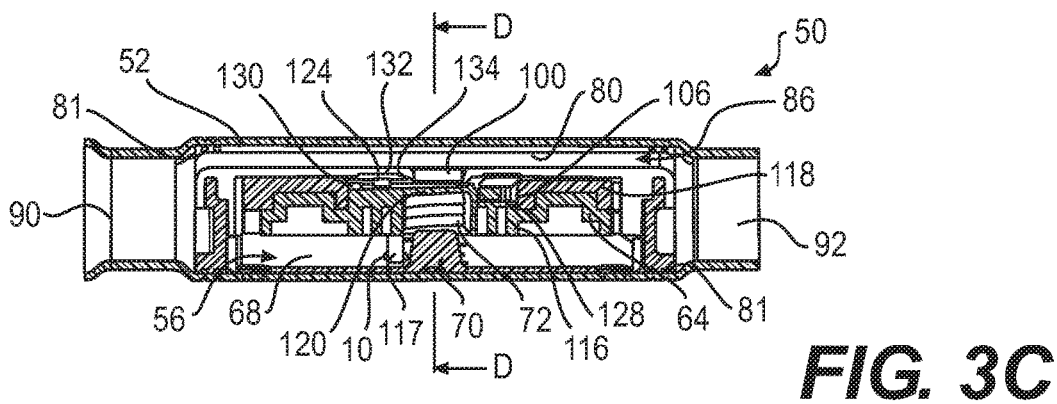
FIG. 3C is a longitudinal section along line C-C in FIG. 3A.
Figure 3D:
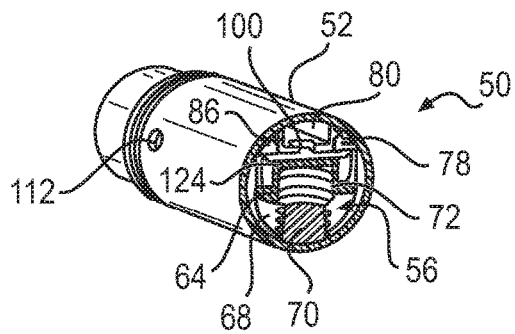
FIG. 3D is a section along line D-D in FIG. 3C.
Figure 3E:
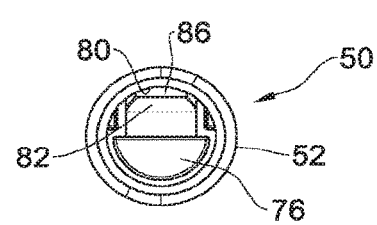
FIG. 3E is an end view of the tubing segment having a roll-over valve of FIG. 3A.
Figure 5C:
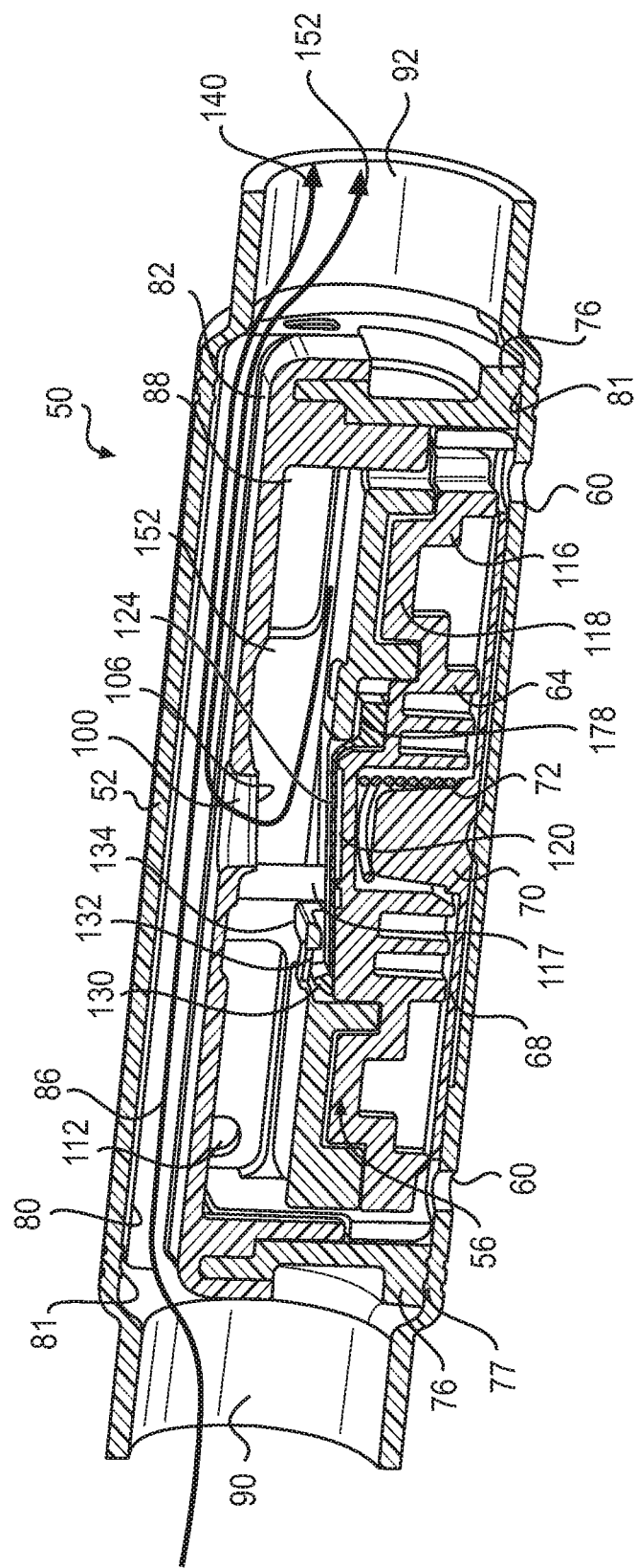
FIG. 5C is a longitudinal section illustrating of tubing segment having the valve of FIG. 5A at a fully open position and indicating flow paths therethrough.

The cage assembly 56 accommodates a float member 64 axially displaceable within the cage assembly 56 between a lowermost, open position (FIG. 5C), and an uppermost sealed position as illustrated in FIGS. 3C, 3D and 5A as will be discussed hereinafter in further detail. The cage assembly 56 further comprises a base member 68 having a trough-like cross-section (clearly seen in FIG. 3D) and configured with a central boss 70 supporting a coiled spring 72 biasing the float member 64 into its upper position, to be discussed hereinafter in further detail.

The cage assembly 56 further comprises a pair of side plates 76 sealingly disposed within the tube segment 52 at respective sides of the ROV 50 with a bridging member 78 extending between the side plates 76 and spaced from an inside upper surface 80 of the housing. For practical reasons the bridging member 78 is co-molded with a tray-like element 82 defining a fluid flow channel 86 extending between the side plates 76, namely constituting fluid flow between a channel inlet 90 and a channel outlet 92 wherein said fluid flow channel 86 is substantially sealed from the inside space 88 of the valve unit, but however with a valve outlet port 100 extending between the space 88 and the fluid flow channel 86. The side plates 76 are in sealing engagement with the inner walls of the respective tube segment 52, thus fluid flow through the tubing system does not enter the inside space of the valve when in the closed position.

The bridinging member 78 according to one example is made of weldable material such as polyethylene such that it can be welded to the inner wall of the tube segment 52, thus, sealing the inner space 88 of the valve from the fuel flowing through the tubing system. Welding of the bridinging member 78 to the wall of the tube segment can be carried out during the extrusion process of the tubing system.

It is appreciated that the channel 86 between the channel inlet 90 and a channel outlet 92 can be formed in any other fashion in such a way which allows fluid flow therein sealed from the inside space 88 of the valve unit.

Figure 4A:
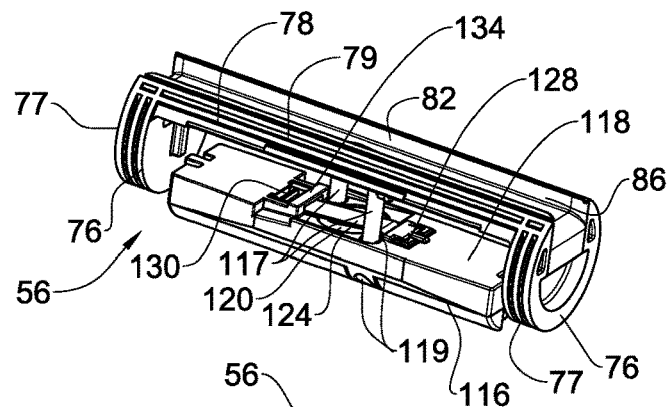
FIG. 4A is an isometric view of a portion of the ROV valve unit, the valve at its fully open position.
Figure 4B:
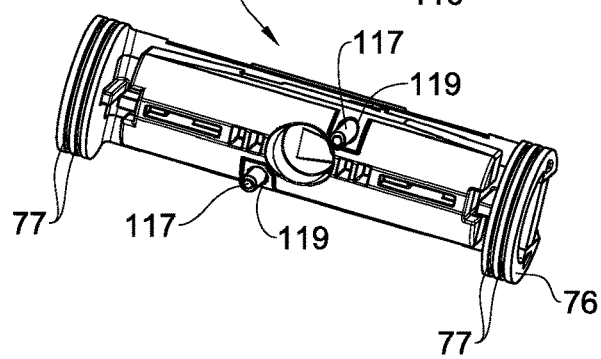
FIG. 4B is a bottom isometric view of the ROV valve unit of FIG. 4A.
Figure 4C:
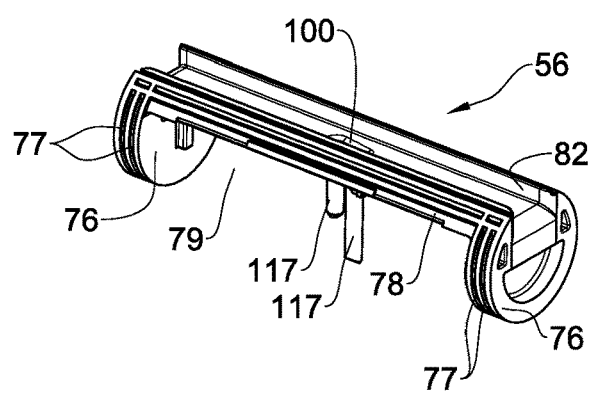
FIG. 4C is a top isometric view of a cage assembly of the valve unit.
Figure 4D:
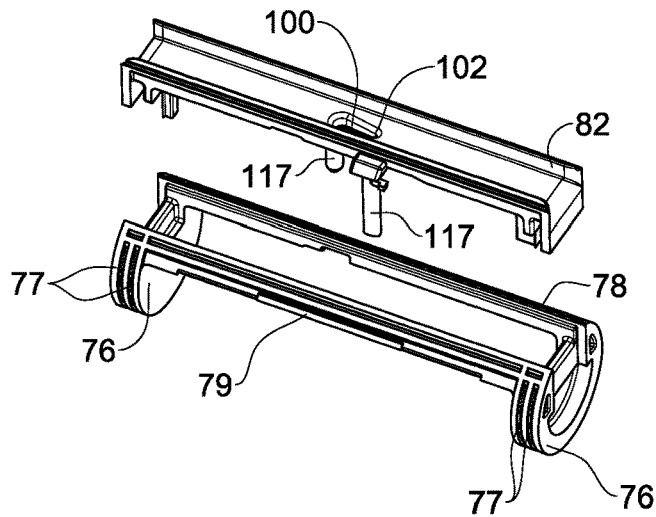
FIG. 4D is an exploded isometric view of the cage assembly of FIG. 4C.

The valve outlet port 100 of the valve unit is considered as an elongate opening, having its right side end 102 narrower than its left side (as best shown in FIG. 4D), said longitudinal slot having its longitudinal axis extending along a longitudinal axis of the ROV 50, with a bottom sealing surface of a valve seating 106 being inclined with respect to a vertical axis of the ROV 50.

As can further be seen, the inside space 88 is vented through venting openings 112 coextending through the base member 68 and the tube segment 52 at an upper portion of the space 88, however, below the fluid flow channel 86.

In order to facilitate buoyant displacement of the float member 64 during the course of fuel-venting a fuel tank (not shown) when the apertures 60 are covered with fuel, the venting openings 112 are provided. The venting openings 112 are configured for venting the fuel tank and for allowing fuel vapor therefrom to enter the space 88 of the valve.

The float member 64 is composed of a base member 116 and a riding member 118 the latter serving as a membrane strip arresting member, as will be discussed hereinafter. The base member 116 is configured with an inclined upper surface 120 substantially equally inclined as the valve seating 106 to ensure efficient sealing engagement by the flexible member strip 124 the latter being clampingly secured at 128 by the member 118 over the base member 116, however with an opposite end of the membrane 124 configured with a stopper member 130 being slidingly displaceable within a recess 132 formed at an upper surface of the base member 116 and an arresting stopper bridge 134 configured for preventing disengagement of the flexible strip member 124 at its maximally deformed position (FIG. 5B).

The arrangement is such that the flexible strip member 124 is deformable between a substantially flat position as disposed over the biasing surface 120 of the float member 64 as illustrated in FIGS. 3A and 5A (fully upwards displaced, closed position) and at the downward open position of FIG. 5C, wherein at the fully deformed position of FIG. 5B the membrane 106 does not detach from the float member 116 but will rather displace downwards together with the downwards displacing float member, as will be discussed hereinafter.

In use, the ROV 50 does not interfere with regular fluid flow through the fluid flow channel 86 between the a first and a second ends defining with together with the inner surface of the tube segment a channel inlet 90 and a channel inlet 92 e.g. between neighboring tube segments and fluid control members such as neighboring additional ROVs and other fuel-vapor control valves, wherein fluid flow takes place along the fluid flow channel 86 as illustrated by arrowed line 140, which fluid flow takes place regardless if the ROV 50 is in its open or closed position.

At the event of liquid rise within the fuel tank, fuel-vapor enters through the apertures 60 and the inlet ports into the internal space 88, resulting in buoyancy forces acting on the float member 64, together with the biasing effect of the spring 72, resulting in upwards displacement into sealing engagement of the flexible strip member 124 against the valve seating 106, in a fluid-type sealing fashion, thus preventing fluid flow through the valve outlet port 100, as illustrated in the closed position of FIGS. 3C, 3D and 5A.

However, at the absence of buoyant forces acting on the float member 64, gravity forces acting on the float member 64 tend to displace it away from the valve outlet port 100, against biasing force of coiled spring 74 so as to progressively detach the flexible membrane strip 124 away from sealing engagement from the sealing seat 106 of the valve outlet port 100, as illustrated in FIG. 5B (whilst the flexible membrane strip 124 is still engaged with the seating of the outlet, however upon partial displacement in a downwards direction of the float member 64, wherein further displacement of the float assembly in a downwards sense entails fully opening of the outlet port (FIG. 5C) facilitating fluid flow from the space 88, through outlet port 100 into the fluid flow channel 86, as illustrated by the arrowed lines 152 whereby fuel-vapor vapor is now free to flow through channel outlet 92 towards a fuel-vapor vapor treating device (not shown).

At the event of extreme acceleration of the vehicle or extreme slope, or at the event of rollover of the vehicle, the float member 64 together with the effect of the biasing coil spring 72 tend to displace the sealing assembly into the closed position, preventing liquid fuel from exiting through the valve outlet port 100.

The float member 64 can be made as solid material without an internal volume for example, Polyoxymethylene. This, fuel inside the fule vapor system cannot enter an internal volume of the float member which can result in a malfunction of the valve. It is appreciated that the tray-like element 82 and the side plate 76 with the intermediate bridging member 78 can constitute an integral part, or be integrated thereafter during a molding process or for example by snap fastening to one another. according to another example however, coupling the tray-like element 82 and the side plate 76 is carried out in bonding process for example by over molding such as insert or 2K molding.

It is also appreciated that the float member 64 may constitute of a single member as opposed to the illustrated example composed of the base member 116 and the riding member 118, the latter serving also for the purpose of arresting the membrane strip 124, in which case the membrane strip is secured to the float member by a different configuration.

Even more so, in a particular illustrated example the valve outlet port 100 and respectively the valve seating 106 extend with a longitudinal axis substantially parallel to a longitudinal axis of the valve unit. Likewise, the membrane strip 124 extends in the same orientation. However, in accordance with a different example (not illustrated) the valve outlet port 100 extends at an orientation rotated by 90°, i.e. perpendicular to the longitudinal axis of the valve unit, with the valve seating 106 and the membrane strip 124 respectively extending in a corresponding orientation.

It is further noted that the side plates 76 are secured within the tube segment 52 in a sealing fashion and for that purpose the side plates 76 are configured with sealing ribs 77 and likewise, the bridging member 78 is configured with longitudinal sealing ribs 79 configured for sealing engagement by appropriate formations 81 formed in the inner wall of the tube 52 during the extrusion process.

In order to ensure smooth displacement of the float member 64 during its upward and downward displacements, namely to prevent clamping arresting owing to non-level displacement, a pair of guides in the form of vertically extending studs 117 project downwards from the tray-like element 82 into respective bores 119 extending through the float member 64, namely through the base member 116 and the riding member 118. The arrangement is such that the studs 117 extend in relative close proximity to one another (however non-collinear along the longitudinal axis of valve unit) thereby facilitating for smooth elevation and descending of the float assembly substantially without any clamping. The guides likely extend proximate to a center axis of the float member.

In this connection it is noted that to prevent distortion of the guiding studs 117 it is desired that they be manufactured of a material which substantially does not undergo blowing or shape distortion under effect of fuel-vapor, such as PA12 (polyamide).

According to one example the tray-like element 82 defines the valve outlet port 100 and includes the guides extending therefrom into the inner space 88. According to this example the tray-like element 82 can be made of a polyamide.

According to an example of the presently disclosed subject matter the fuel-vapor system can be continuous tubing having a plurality of segment. For example, the tubing can include at least one pliable segment configured to retain the shape thereof, at least one flattened segment for applying an attachment and orientation member thereto, at least one segment configured for receiving therein a fuel vapor accessory; and an outlet opening for coupling to an outlet aperture of a fuel tank. The pliable segment can be a convoluted flexible portion. The flattened segment is configured for orientation of the vehicle fuel-vapor system such that the fuel-vapor accessory is positioned in appropriate upright position.

The continuous tubing can be formed with a sequence of segments each characterized to perform a specific action, for example an outlet segment configured to be coupled to a fuel tank outlet aperture, followed by a pliable segment, which is followed by a segment configured to hold ROV, a flattened segment, and an end segment having a stopper wall.

Figure 6A:
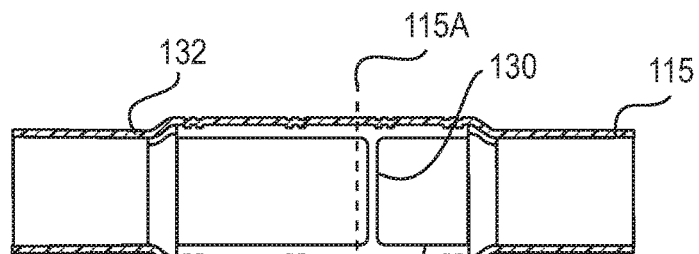
FIG. 6A is a sectional view of a a fuel-vapor tube segment fitted with an annular insert.
Figure 6B:
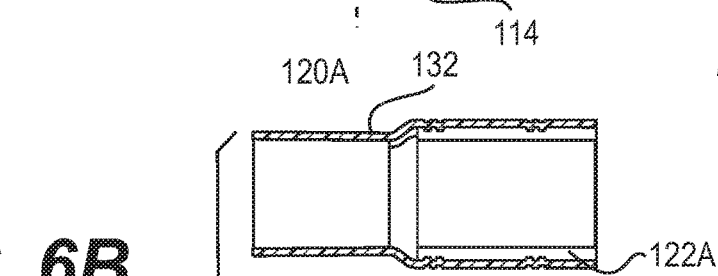
FIG. 6B illustrates the fuel-vapor tube segment of FIG. 6A being divided to two end segments.
Figure 7A:
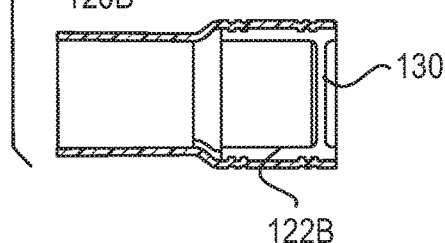
FIG. 7A is a longitudinal sectioned view illustrating assembling the end segment of FIG. 6B with an end coupler unit.
Figure 7A:
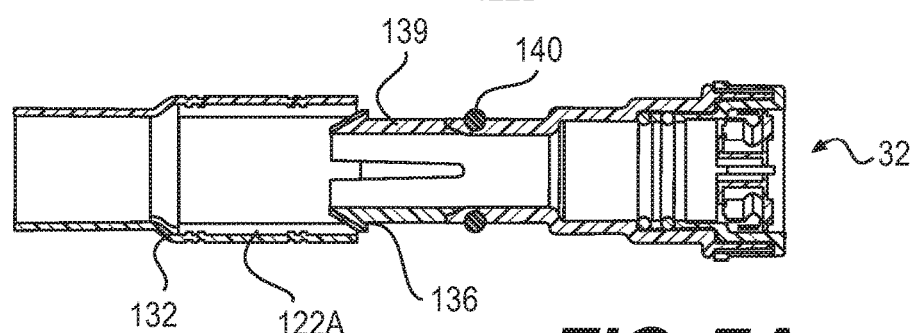
Figure 7B:
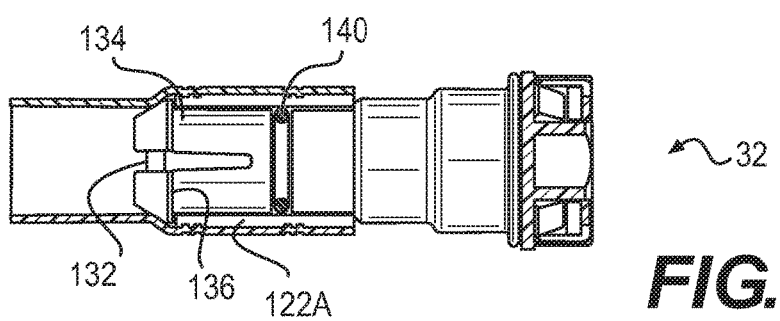
FIG. 7B is a sectional view illustrating the end coupler unit secured within the fuel-vapor tube end segment.
Figure 7C:
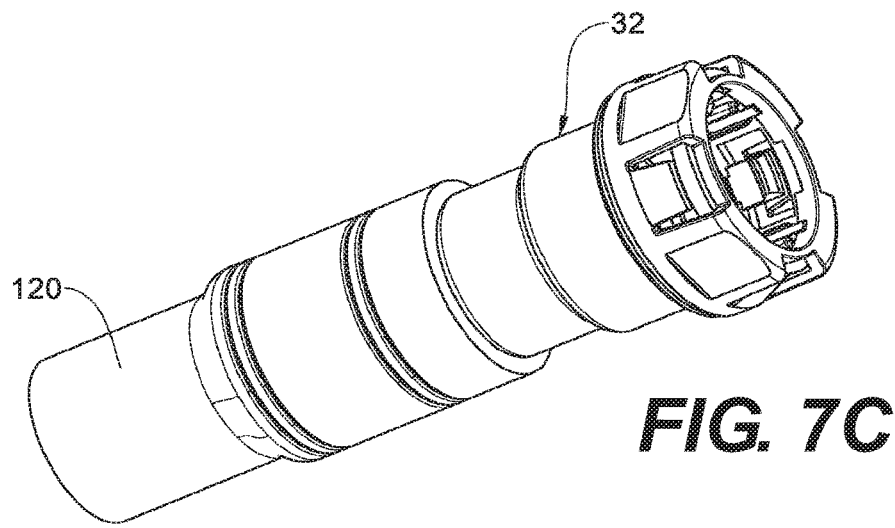
FIG. 7C is an isometric view of the assembled fuel-vapor tube end segment within the end coupler unit.
Figure 7D:
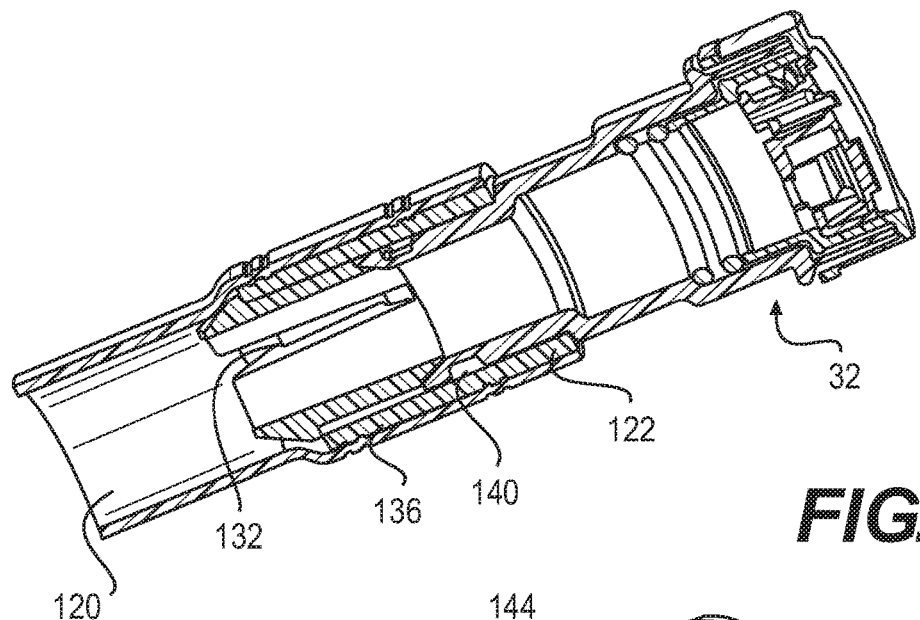
FIG. 7D is a longitudinal sectioned view of FIG. 7C.

Turning now to FIGS. 6A and 6B there is illustrated a process for manufacturing continuous tubing. The tubing can be manufactured as a repeating sequence of segments which can be cut at a specific location along the length thereof so as to allow each of the segments to be installed inside fuel tank. The continuous tubing is formed such the the end segment is followed by an outlet segment, such cutting the tubing between the end segment and the outlet segment provides two tubing systems. A reinforcing member can be introduced into the end and the outlet segment, thus providing additional strength to the two ends of the system.

As shown in FIG. 6A, the fuel-vapor tube segment 115 is extruded, said tube segment typically made of polyethylene. During the extrusion process an annular insert 114 can be integrally molded within the extruded tube segment, said insert 114 also made of polyethylene and however being sealingly welded to the inner surface of the tube segment. The insert serves as a reinforcing element for holding therein a fuel vapor accessory, such as an end coupler. The insert 114 can include a stopper wall 130 such that the insert can constitute the end of the fuel-vapor system. Positioning of the insert 114 within the extruded tube segment 115 is in register with a location at which the tube is eventually to be cut, e.g. partition line 115a (FIG. 6A) resulting in two end pieces 120A and 120B (FIG. 6B), each fitted with a portion of a reinforcing member 122A and 122B, respectively. The partition line 115a can be adjacent the stopper wall 130, thus, after cutting of the insert 114, one of the end pieces 120B of 120A includes a stopper wall and thus can serve as a an end In the illustrated example, the right side of the end pieces 120B is configured with the stopper wall 130 (best seen in FIG. 8) thus serving as a sealing end piece for a tubular segment, while the other end piece 120A serve as the first segment of the fuel vapor system, which can be the outlet segment configured to be coupled to an outlet aperture of the fuel tank or to another fuel-vapor system. Noting that a tubular pipe segment made of polyethylene may blow or distort under the effect of fuel-vapor extending therethrough, the provision of a reinforcing insert 114, also made of polyethylene and welded within the tubular segment prevents such distortion of the fuel-vapor tube segment.

Furthermore, as can be seen in the drawings, the end 132 of the reinforcing member 122A constitute a wall portion against which various snap fit couplings may engage, as disclosed hereinafter in connection with FIGS. 7A-7D, illustrating how an end coupler 32 snappingly engages at an end of a tubular segment with its elastic snapping prongs 134 configured for snappingly engagement within reinforcing member 122A such that the prongs 134 snappingly engages and is arrested by the end 132 of the reinforcement member 122A. A sealing member, in the form of an O-ring 140 can received over an annular portion of the end coupler 32 configured for sealing engagement within the reinforced end member 122A.

It is appreciated that whilst a particular configuration of an end coupler 32 is illustrated, other forms may serve as well. For example, as opposed to a snap-type coupler, screw-couplers may be configured, bayonet-type couplers, and the like.

Figure 9A:
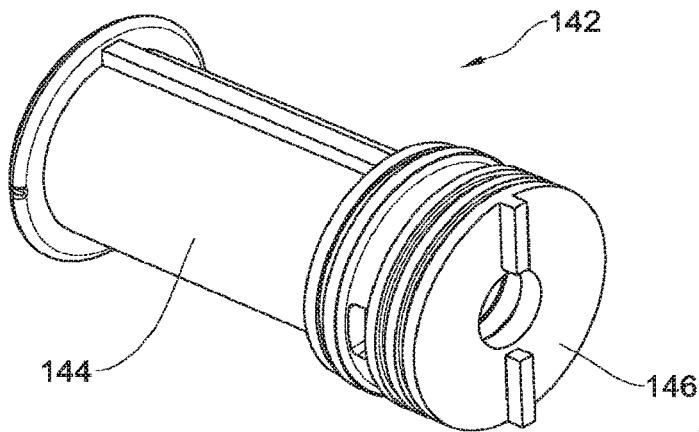
FIG. 9A is an isometric view of a pressure holding valve (PHV) seen in FIG. 2B.
Figure 9B:
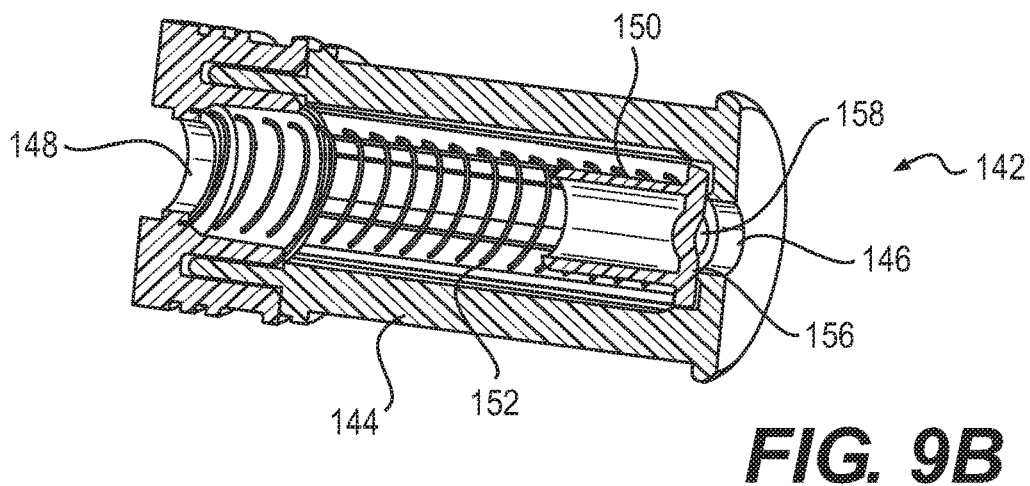
FIG. 9B is a longitudinally sectioned isometric view of the PHV valve of FIG. 9A at its closed position.
Figure 9C:
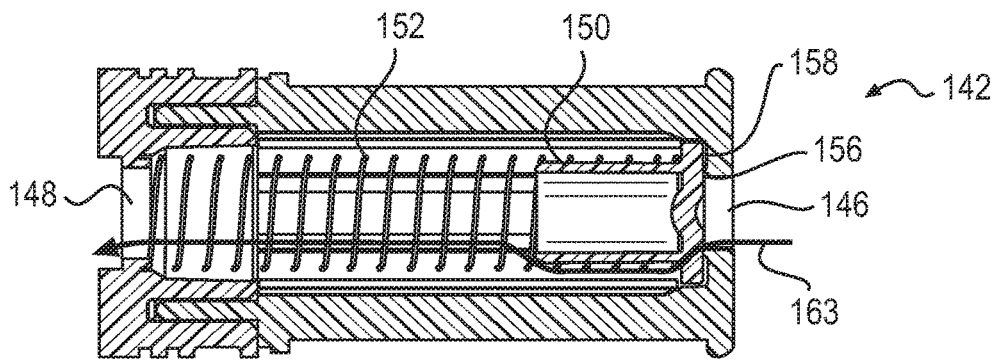
FIG. 9C is a longitudinally sectioned isometric view of the of FIG. 9A at its open position.

Turning now to FIGS. 9A, 9C there is illustrated the pressure holding valve PHV generally designated 142 which as seen in FIGS. 2A and 2B extends coextensively within the fuel-vapor tube segment, in line with the other fuel-vapor components.

The pressure holding valve 142 is configured as a tubular housing 144 having an inlet port 146 and an outlet port 148, coaxially extending with a sealing plunger member 150 slidingly disposed within the housing and normally biased into sealing engagement of the inlet port by a coiled spring 152. As can be seen in the drawings, an annular sealing seat 156 in a form of an annular protrusion surrounds the inlet port 146 wherein a forehead surface, namely a sealing surface 158 of the plunger 150 is configured for sealing biasing against said sealing seat 156.

The arrangement is such that as long as the pressure as the inlet port 146 does not exceed the pressure at the outlet port 148 together with the force applied to the plunger 150 by the coiled spring 152, the pressure holding valve remains in its sealed, closed position as in FIG. 9B. However, upon pressure decrease at the outlet port, or respective pressure increase at the inlet port 146, the plunger 150 displaces from its sealing engagement with the sealing seat 156, into the position of FIG. 9C, facilitating fluid flow in direction of the arrowed flow line 163. Upon reaching pressure equilibrium (taking into consideration the force applied by the compression spring 152) the plunger 150 will displace back into its normally closed position of FIG. 9B.

Figure 10A:
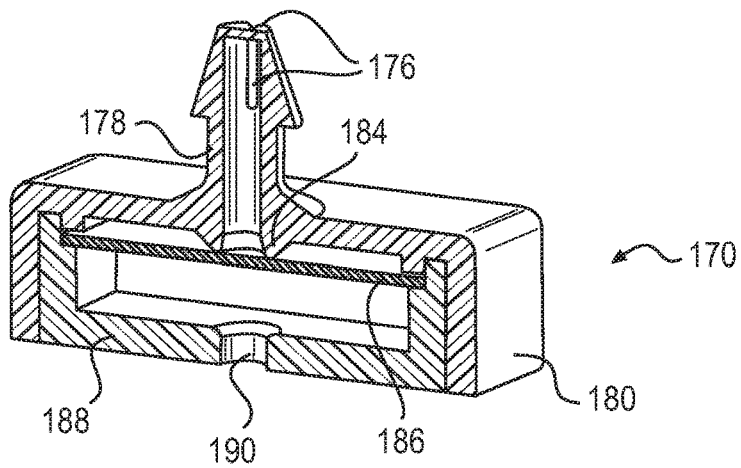
FIG. 10A is a longitudinally sectioned isometric view of a drain valve (DV) seen in FIGS. 2A and 2B, the valve at its sealed position.
Figure 10B:
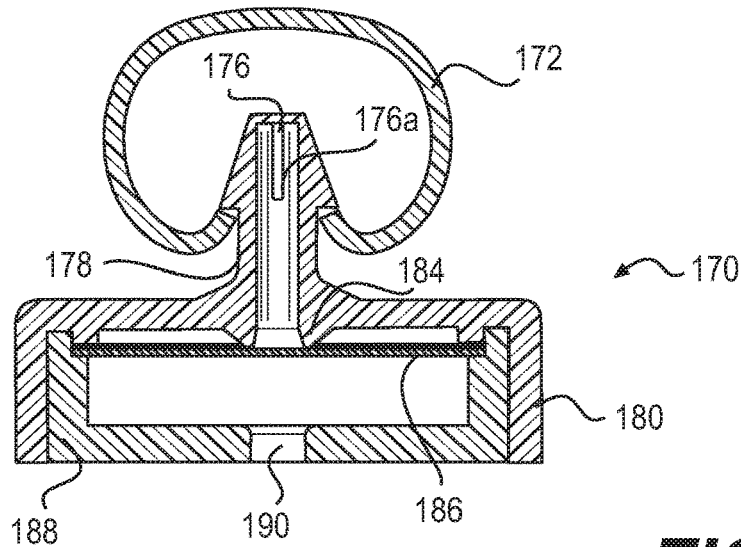
FIG. 10B is a longitudinal section of the drain valve of FIG. 10A with a portion of a fuel tube segment.
Figure 10C:
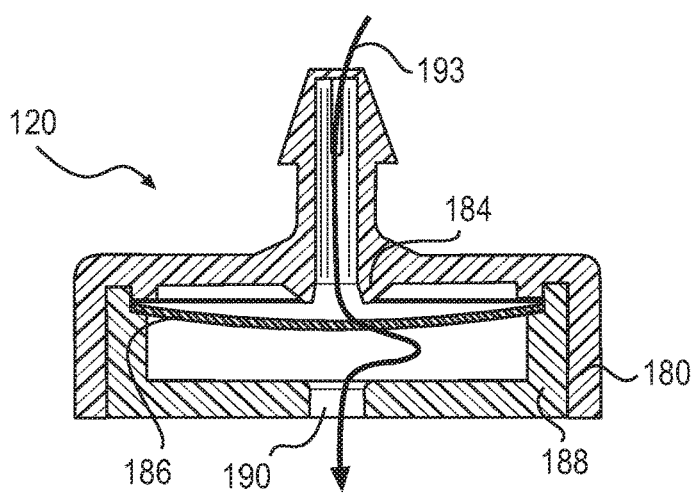
FIG. 10C is a longitudinal section of the DV valve taken along line X-X in FIG. 2B, illustrating a fluid flow path through the DV at its open position.

In FIGS. 10A-10C there is illustrated an example of a snap-type drain valve generally designated 170 and configured for snappingly articulating to a fuel-vapor pipe segment 172 (FIG. 10B) by snapping engagement. The draining valve 170 of the particular configuration is a one-way valve configured with fluid inlet ports 176 configured at a thumb-tack like shank 178 and configured for snappingly engagement and arrestment at a location of the tube segment, typically at a bottommost portion thereof, and wherein the inlet port 176 is configured with at least a lowermost portion 176A extending substantially adjacent the lowermost portion of the respective fuel-vapor pipe segment 172.

The housing 180 of the drain valve 170 is configured with a sealing seating 184 normally sealed by a flexible sealing membrane 186 retained by a supporting insert 188. Outlet port 190 extends through the support 188 and the arrangement is such that the drain valve 170 is normally at a sealed position (FIGS. 10A and 10B) prohibiting any fluid flow therethrough. However, upon pressure increase within the respective fuel-vapor pipe segment 172 the sealing membrane 186 deforms into its open position (FIG. 10C) to facilitate fluid flow therethrough as illustrated by the arrowed line 193.

It is however appreciated that other configurations of drain valves are possible too, e.g. mushroom type valves and the like or configured for drainage of liquid from the fuel-vapor pipe segment 172 back into the fuel tank.

Figure 11A:
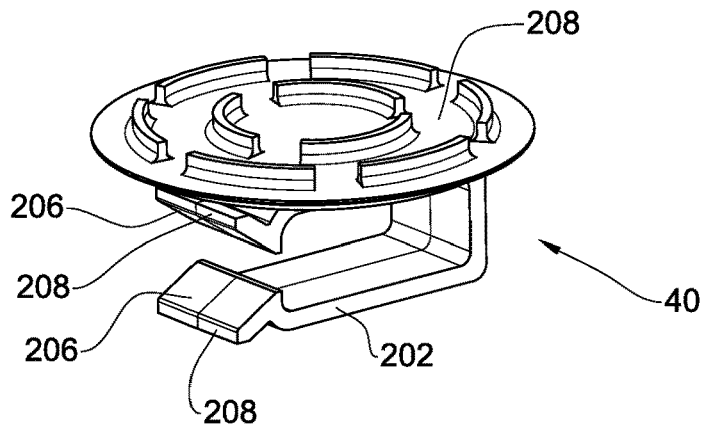
FIG. 11A is an isometric view of an attachment member configured for attaching a fuel-vapor tube segment to an inside wall of a fuel tank.
Figure 11B:
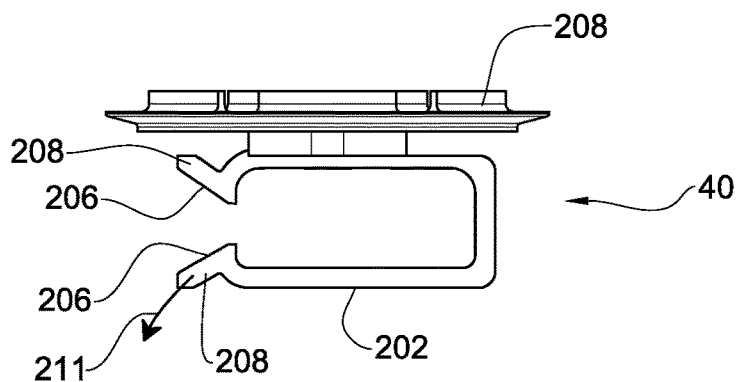
FIG. 11B is a side view of FIG. 11A.
Figure 11C:
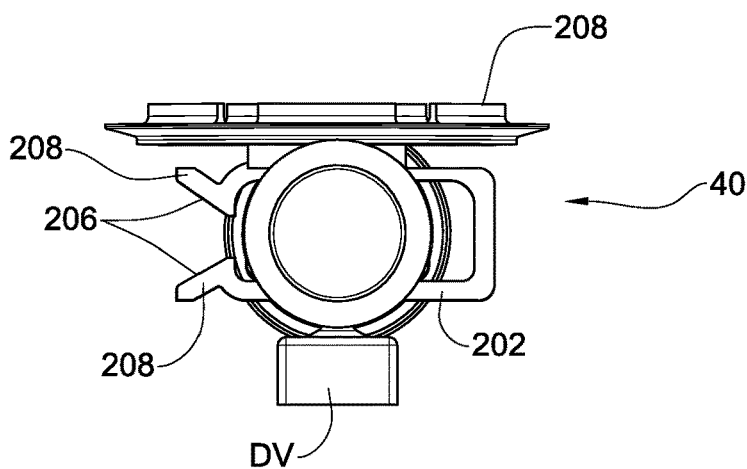
FIG. 11C is a side view of the attachment member holding a fuel-vapor tube segment.

Turning now to FIGS. 11A-11C there is illustrated an attachment member generally designated 40 configured for positioning and securing the fuel-vapor tube system within a fuel tank at particular locations, to both prevent motion thereof as well as to impart it with the required orientation as required for proper operation for example of the ROV as discussed hereinabove, namely to ensure that the inlet ports extend at a bottommost location and that the float member is displaceable in a substantially upright direction (along a vertical axis). The attachment member 40 comprises an open frame portion 202 having a rectangle shape, the size and shape thereof configured for snugly and securely accommodating the flattened portion 38 of the fuel-vapor tube segment (see FIGS. 2A and 2B), thus preventing displacement of the tube segment with respect to the attachment member 40. The open frame portion 202 is elastic to some extent to facilitate insertion of the flattened portion 38 therein, with appropriate gliding surfaces 206 for ease of insertion of the tubular segment therein. A welding portion 208 is configured at a top portion of the attachment member 40, configured for welding attachment to an inside wall surface of the fuel tank (not shown), as known in the art.

It is appreciated that attachment member 40 can include different portions configured to impart the tubing with the required orientation as required for proper operation for example of the ROV. For example, the tube can include a flat vertical portion, (as opposed to the horizontal flat portion shown in FIG. 2A), and the attachment member 40 include frame portion 202 having a corresponding orientation.

It is noted that the fuel-vapor tube may be removed from the attachment member by deforming the attaching portion in direction of arrow 211 (FIG. 11B) against the elasticity of the material. If desired, suitable arresting member, e.g. a band, may be applied over the gliding surfaces 206, to thereby prevent their unintentional displacement.

Figure 12:
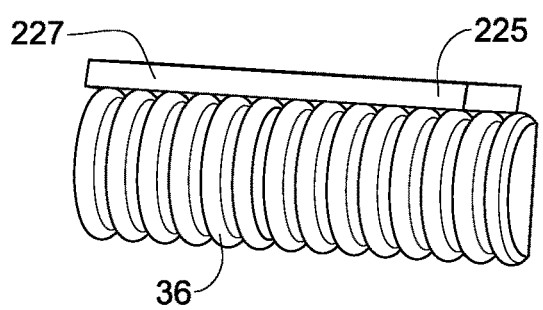
FIG. 12 illustrates a different configuration for attaching a fuel-vapor tube segment to an inside wall of a fuel tank.

It is also appreciated that the corrugated fuel-vapor tube segment 36 may be directly mounted to a portion of the fuel tank, e.g. by an intermediate welding mounting plate 225 as illustrated in FIG. 12, directly by applying heat such that the mounting plate 225 becomes welded to the corrugated tube portion 36 at one face thereof with its top face 227 secured to an inside surface of the fuel tank, e.g. by heat welding as well.

The invention claimed is:

1. A fuel-vapor system, comprising:
a continuous tubing having a plurality of segments, including at least one pliable segment, at least one flattened segment, and at least one first segment, the plurality of segments being sequentially connected to one another along a longitudinal axis of the continuous tubing;
the at least one pliable segment configured to retain a shape of said at least one pliable segment;
the at least one flattened segment configured for applying an attachment and orientation member to said at least one flattened segment to thereby prevent motion between said continuous tubing and said attachment and orientation member and to thereby fix an orientation between said continuous tubing and said attachment and orientation member;
the at least one first segment configured for receiving a fuel vapor accessory in said at least one first segment; and
the fuel-vapor system further comprising an outlet opening for coupling to an outlet aperture of a fuel tank;
wherein said first segment is provided with at least one venting opening and inlet apertures for operation of said fuel vapor accessory;
wherein said fuel-vapor accessory is a roll over fuel-vapor valve comprising a housing defining a channel extending between a channel outlet and a channel inlet and further comprising a valve having a valve inlet port extending through a wall of the housing being in flow communication with said inlet apertures and a valve outlet port extending into said channel and a float member disposed between said valve inlet port and said valve outlet port and said float member being displaceable between an open position of said valve wherein fluid flow is facilitated between said valve inlet port and said channel, and a closed position; and
wherein the channel inlet and the channel outlet extend coaxially with said first segment.

2. The fuel-vapor system of claim 1, wherein said pliable segment is a convoluted flexible portion.

3. The fuel-vapor system of claim 1, wherein said flattened segment is configured for orientation of the fuel-vapor system such that said fuel-vapor accessory is positioned in appropriate position required for proper operation of said fuel-vapor accessory.

4. The fuel-vapor system of claim 3, wherein said flattened segment is configured to be snugly and securely accommodated by an attachment member.

5. The fuel-vapor system of claim 4, wherein said flattened segment is configured to be inserted in a frame portion of said attachment member.

6. The vehicle fuel-vapor system of claim 5, wherein said flattened segment comprises a rectangular transverse cross-sectional shape configured to be securely seated in said frame portion.

7. The fuel-vapor system of claim 1, wherein said housing is a tubular housing accommodating a cage assembly fixedly disposed in said housing and defining an inside space accommodating said float member.

8. The fuel-vapor system of claim 7, wherein said inside space of the valve is vented by said at least one venting openings.

9. The fuel-vapor system of claim 1, the channel inlet is configured for coupling to a neighboring fuel-vapor component.

10. The fuel-vapor system of claim 1, wherein the housing is an integral portion of said first segment.

11. The fuel-vapor system of claim 1, further comprising at least one second segment configured for holding a pressure holding valve.

12. The fuel-vapor system of claim 11, further comprising said pressure holding valve, wherein said pressure holding valve is integrally formed within said at least one second segment.

13. The fuel-vapor system of claim 11, further comprising said pressure holding valve, wherein said pressure holding valve is coupled to one end of said at least one second segment.

14. The fuel-vapor system of claim 1, further comprising at least one third segment configured for holding a drain valve and having a drainage aperture configured for coupling to the drain valve.

15. The fuel-vapor system of claim 1, wherein the at least one flattened segment is different from the fuel vapor accessory.

16. A fuel-vapor system, comprising:
at least one pliable segment configured to retain a shape of said at least one pliable segment;
at least one flattened segment configured for applying an attachment and orientation member to said at least one flattened segment;
at least one first segment configured for receiving a fuel vapor accessory in said at least one first segment; and
an outlet opening for coupling to an outlet aperture of a fuel tank;
wherein said first segment is provided with at least one venting opening and inlet apertures for operation of said fuel vapor accessory;
wherein said fuel-vapor accessory is a roll over fuel-vapor valve comprising a housing defining a channel extending between a channel outlet and a channel inlet and further comprising a valve having a valve inlet port extending through a wall of the housing being in flow communication with said inlet aperture and a valve outlet port extending into said channel and a float member disposed between said valve inlet port and said valve outlet port and being displaceable between an open position of said valve wherein fluid flow is facilitated between said valve inlet port and said channel, and a closed position;
wherein the channel inlet and the channel outlet extend coaxially with said first segment;
wherein said housing is a tubular housing accommodating a cage assembly fixedly disposed in said housing and defining an inside space accommodating said float member; and
wherein the channel inlet and the channel outlet are sealed from the inside space of the valve when said valve is in said closed position.

17. A fuel-vapor system, comprising;
at least one pliable segment configured to retain a shape of said at least one pliable segment;
at least one flattened segment configured for applying an attachment and orientation member to said at least one flattened segment;
at least one first segment configured for receiving a fuel vapor accessory in said at least one first segment; and
a first outlet opening for coupling to an outlet aperture of a fuel tank;

wherein said first segment is provided with at least one venting opening and inlet apertures for operation of said fuel vapor accessory;

wherein said fuel-vapor accessory is a roll over fuel-vapor valve comprising a housing defining a channel extending between a channel outlet and a channel inlet and further comprising a valve having a valve inlet port extending through a wall of the housing being in flow communication with said inlet aperture and a valve outlet port extending into said channel and a float member disposed between said valve inlet port and said valve outlet port and being displaceable between an open position of said valve wherein fluid flow is facilitated between said valve inlet port and said channel, and a closed position;

wherein said housing is a tubular housing accommodating a cage assembly fixedly disposed in said tubular housing and defining an inside space accommodating said float member, and wherein the cage assembly comprises a pair of side plates configured for sealing engagement with inner walls of said first segment at respective sides of the at least one inlet port, a bridging member extending between the side plates and spaced from an inside surface of said first segment, said bridging member constituting the channel which is sealed from an inside space of the roll over fuel-vapor valve defined between said side plates and said bridging member, but via a second outlet opening formed in said bridging member, and a base member disposed between the side plates and configured with a boss supporting a float member biasing spring.

18. A fuel tank having a vehicle fuel-vapor system mounted in the fuel tank and comprising;

a continuous tubing having a plurality of segments, including at least one pliable segment, at least one flattened segment, and at least one first segment, the plurality of segments being sequentially connected to one another along a longitudinal axis of the continuous tubing;

the at least one pliable segment configured to retain a shape of said at least one pliable segment;

the at least one flattened segment configured for applying an attachment and orientation member to said at least one flattened segment, said flattened segment having a mounting location in a form of a flattened tubular portion, to thereby prevent motion between said continuous tubing and said attachment and orientation member and to thereby fix an orientation between said continuous tubing and said attachment and orientation member;

the at least one first segment configured for receiving a fuel vapor accessory in said at least one first segment;

the fuel-vapor system further comprising an outlet opening for coupling to an outlet aperture of the fuel tank;

wherein said first segment is provided with at least one venting opening and inlet apertures for operation of said fuel vapor accessory;

wherein said fuel-vapor accessory is a roll over fuel-vapor valve comprising a housing defining a channel extending between a channel outlet and a channel inlet and further comprising a valve having a valve inlet port extending through a wall of the housing being in flow communication with said inlet aperture and a valve outlet port extending into said channel and a float member disposed between said valve inlet port and said valve outlet port and being displaceable between an open position of said valve wherein fluid flow is facilitated between said valve inlet port and said channel, and a closed position; and wherein the channel inlet and the channel outlet extend coaxially with said first segment.

* * * * *